United States Patent
Hiltzik et al.

(10) Patent No.: US 7,179,382 B2
(45) Date of Patent: *Feb. 20, 2007

(54) COATED ACTIVATED CARBON FOR AUTOMOTIVE EMISSION CONTROL

(75) Inventors: Laurence H. Hiltzik, Charleston, SC (US); Edward D. Tolles, Charleston, SC (US); David R. B. Walker, Charleston, SC (US)

(73) Assignee: MeadWestvaco Corporation, Glen Allen, VA (US)

( * ) Notice: Subject to any disclaimer, the term of this patent is extended or adjusted under 35 U.S.C. 154(b) by 590 days.

This patent is subject to a terminal disclaimer.

(21) Appl. No.: 10/287,492

(22) Filed: Nov. 5, 2002

(65) Prior Publication Data

US 2003/0082382 A1    May 1, 2003

Related U.S. Application Data

(63) Continuation-in-part of application No. 09/448,034, filed on Nov. 23, 1999, now abandoned.

(51) Int. Cl.
   *B01D 3/00* (2006.01)

(52) U.S. Cl. ............. 210/633; 210/634; 210/651; 95/90; 95/146; 95/148

(58) Field of Classification Search ........... 210/633, 210/634, 651; 95/90, 146, 148

See application file for complete search history.

(56) References Cited

U.S. PATENT DOCUMENTS 4,476,169 A * 10/1984 Nishino et al. ............. 428/34
6,540,815 B1 * 4/2003 Hiltzik et al. .............. 95/146

* cited by examiner

*Primary Examiner*—Ieszek B. Kiliman
(74) *Attorney, Agent, or Firm*—Terry B. McDaniel

(57) ABSTRACT

A method for avoidance of attrited carbon dust is disclosed to lead to improved canister performance in emission control. Product attrition by dusting of granular and shaped activated carbons is disclosed to be reduced significantly, or essentially eliminated, by the application of a thin, continuous polymer coating on the granular or shaped activated carbon, without a reduction in adsorption velocity or capacity of the activated carbon when used in automotive emission control canisters.

20 Claims, 3 Drawing Sheets

COATED ACTIVATED CARBON FOR AUTOMOTIVE EMISSION CONTROL

This application is a continuation-in-part application of Ser. No. 09/448,034 titled "Coated Activated Carbon," by L. H. Hiltzik, E. D. Tolles, and D. R. B. Walker, filed on Nov. 23, 1999 now abandoned.

BACKGROUND OF THE INVENTION

1. Field of the Invention

This invention relates to activated carbon pellets and activated granules for automotive emission control canisters with improved dusting characteristics. In particular, this invention relates to activated carbons susceptible to dust attrition due to abrasion where dusting can result in loss of product and often cause other problems related to its use in automotive emission control canisters.

2. Description of Related Art (Including Information Disclosed Under 37 CFR 1.97 and 37 CFR 1.98

Active carbon long has been used for removal of impurities and recovery of useful substances from liquids and gases because of its high adsorptive capacity. Generally, "activation" refers to any of the various processes by which the pore structure is enhanced. Typical commercial activated carbon products exhibit a surface area (as measured by nitrogen adsorption as used in the B.E.T. model) of at least 300 m²/g. For the purposes of this disclosure, the terms "active carbon" and "activated carbon" are used interchangeably. Typical activation processes involve treatment of carbon sources) such as resin wastes, coal, coal coke, petroleum coke, lignites, polymeric materials, and lignocellulosic materials including pulp and paper, residues from pulp production, wood (like wood chips, sawdust, and wood flour), nut shell (like almond shell and coconut shell), kernel, and fruit pits (like olive and cherry stones) either thermally (with an oxidizing gas) or chemically (usually with phosphoric acid or metal salts, such as zinc chloride).

Chemical activation of wood-based carbon with phosphoric acid ($H_3PO_4$) is disclosed in U.S. Pat. No. Re. 31,093 to improve the carbon's decolorizing and gas adsorbing abilities. Also, U.S. Pat. No. 5,162,286 teaches phosphoric acid activation of wood-based material which is particularly dense and which contains a relatively high (30%) lignin content, such as nut shell, fruit stone, and kernel. Phosphoric acid activation of lignocellulose material also is taught in U.S. Pat. No. 5,204,310 as a step in preparing carbons of high activity and high density.

Also, U.S. Pat. No. 4,769,359 teaches producing active carbon by treating coal cokes and chars, brown coals or lignites with a mixture of NaOH and KOH and heating to at least 500° C. in and inert atmosphere. U.S. Pat. No. 5,102, 855 discloses making high surface area activated carbon by treating newspapers and cotton linters with phosphoric acid or ammonium phosphate. Coal-type pitch is used as a precursor to prepare active carbon by treating with NaOH and/or KOH in U.S. Pat. No. 5,143,889.

Once the activated carbon product is prepared, however, it may be subject to some degradation before and during its use. Abrading during materials handling and actual use of such activated carbon results in loss of material in the form of dust. Such "dusting" of the product is a function of its relative hardness and its shape, as well as how it is handled in the plant—in moving it into and out of plant inventory, in loading for transport and in off-loading by the receiver, and how it is handled by the receiver to place the product into use. In certain applications, such as employment in canisters in automobiles where the activated carbon is subject to constant vibration and may have to withstand collision, product degradation by dusting continues through the life of the product.

The hardness of an activated carbon material is primarily a function of the hardness of the precursor material, such as a typical coal-based activated carbon being harder than a typical wood-based activated carbon. The shape of granular activated carbon also is a function of the shape of the precursor material. The irregularity of shape of granular activated carbon, i.e., the availability of multiple sharp edges and corners, contributes to the dusting problem. Of course, relative hardness and shape of the activated carbon are both subject to modification. For example, U.S. Pat. Nos. 4,677, 086, 5,324,703, and 5,538,932 teach methods for making pelleted products of high density from lignocellulosic precursors. Also, U.S. Pat. No. 5,039,651 teaches a method of producing shaped activated carbon from cellulosic and starch precursors in the form of "tablets, plates, pellets, briquettes, or the like." Further, U.S. Pat. No. 4,221,695 discloses making an "Adsorbent for Artificial Organs" in the form of beads by mixing and dissolving petroleum pitch with an aromatic compound and a polymer or copolymer of a chain hydrocarbon, dispersing the resultant mixture in water giving rise to beads, and subjecting these beads to a series of treatments of removing of the aromatic hydrocarbon, infusibilizing, carbonizing, and finally activating.

Despite these and other methods of affecting activated carbon hardness and shape, however, product dusting continues to be a problem in certain applications. For example, in U.S. Pat. No. 4,221,695, noted above, the patentees describe conventional beads of a petroleum pitch-based activated carbon intended for use as the adsorbent in artificial organs through which the blood is directly infused that are not perfectly free from carbon dust. They observe that some dust steals its way into the materials in the course of the preparation of the activated carbon, and some dust forms when molded beads are subjected to washing and other treatments. The patentees note that the application of a film-forming substance to the surface of the adsorbent "is nothing to be desired," because the applied substance acts to reduce the adsorption velocity of the matters to be adsorbed on the adsorbent and limit the molecular size of such matters being adsorbed.

Subsequently, in U.S. Pat. No. 4,476,169, the patentees describe a multi-layer glass window wherein vapor between the glass sheets is adsorbed by a combination of a granular zeolite with granular activated carbon having its surface coated with 1–20 wt % synthetic resin latex. The coating of the activated carbon is described as greatly inhibiting the occurrence of dust without substantially reducing the absorptive power of activated carbon for an organic solvent.

Automotive canisters for controlling fuel vapor emissions use activated carbon in either granular or pelletized forms. Activated carbons, regardless of their form and size, contain some portion of smaller particles, or dust, which can be problematic for valves and filters associated with the canister. This dust can present a nuisance at canister filling operations that dispense and convey bulk quantities of activated carbon. Reduction of dust can reduce the likelihood of valves and filters on canisters becoming partially or fully blocked and relieve the nuisance issues at canister filling locations. Dust issues can arise from either initial dust present as a result of sizing and screening inefficiencies or from dust generated by the action of pellets and granules against one another, which can be quantified as a dust attrition rate.

In addition to dust suppression, the coatings can provide a means of colorizing activated carbon so that it has an appearance besides the customary black, as described in earlier patent notes. Color can serve as a means of identifying different grades and/or manufacturing dates for activated carbon. Different color coatings can provide an effective means of differentiating between different grades, such as low bleed pellets and high capacity pellets that are used in a dual-fill canister that has high capacity and low bleed emissions. Color can also be used as a means of identifying the year the activated carbon was manufactured. Another use of color coating is for quality assurance. For example an automotive manufacturer could demand red BAX 1500 as a means of assuring that a certain manufacturer's product is used.

SUMMARY OF THE INVENTION

Figure 1:
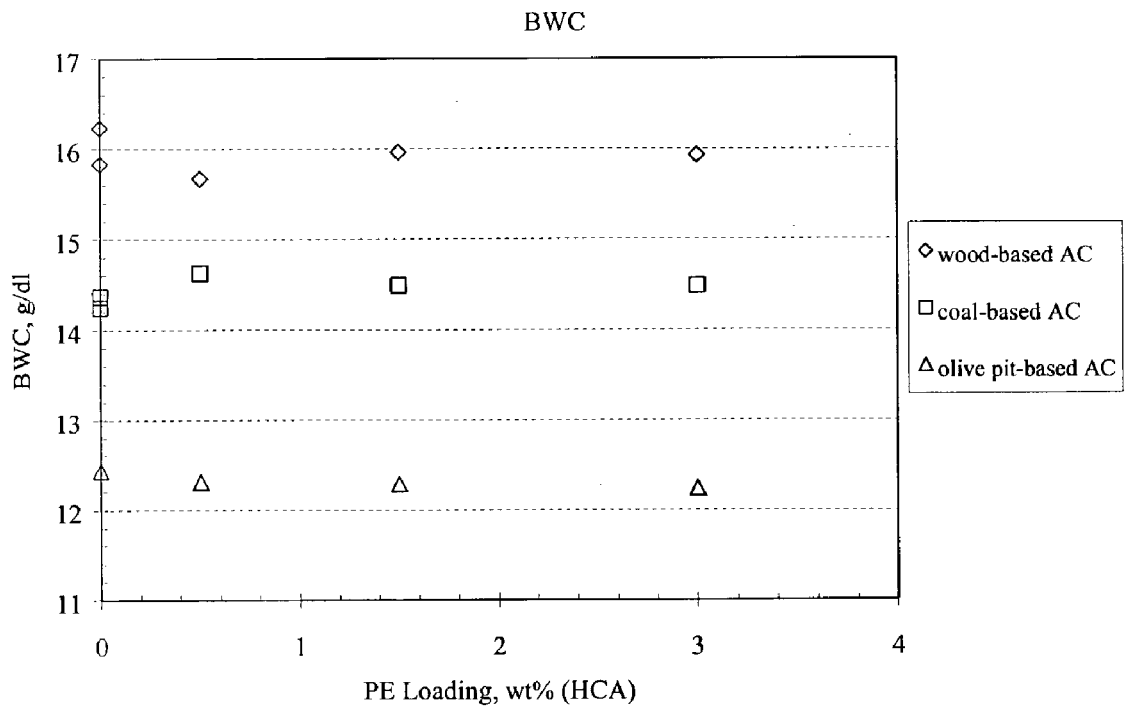
FIG. 1 is a graphical representation of the butane working capacity (BWC) values of polymer coated, shaped activated carbons of various sources, as well as the effect of the polymer coating on their respective BWC values, as reported in Table III.

It has been discovered that product attrition by dusting of granular and shaped activated carbons can, in fact, be reduced significantly, or essentially eliminated, by the application of a thin, continuous polymer coating on the granular or shaped activated carbon, without a reduction in adsorption velocity or capacity of the activated carbon used in automotive emission control canisters. The avoidance of attrited carbon dust leads to improved canister performance in emission control.

DESCRIPTION OF THE PREFERRED EMBODIMENT(S)

Dusty automotive carbon pellets pose potential problems in materials handling and in canister applications. A method is disclosed based on applying a visible polymer coating on the finished product and then removing any residual dust. The product is considered dust free, as shown by an "initial dust" value of $\leq 0.3$ mg/dL and a "dust rate" value of $\leq 0.01$ mg/min/dL, both below the detection limits of the standard dust attrition test. The product is "essentially" dust free, as shown by a "dust rate" value of $\leq 0.06$ mg/min/dL, a detectable value but dramatically lower than the dust rate of uncoated activated carbon and, as noted in the Tables which follow in the Examples, is the highest dust rate value of the invention-treated activated carbons. The retention of butane adsorption and working capacity properties are an important feature of the coated pellets. As shown in the examples below, the coated pellets retained 94–100% of the uncoated pellet butane activity and 88–100% of the uncoated pellet butane working capacity (BWC). For example, the invention coated shaped and granular activated carbon will have a butane activity of greater than 15 g/100 g, preferably greater than 25 g/100 g, more preferably greater than 35 g/100 g, even more preferably greater than 45 g/100 g, even more preferably greater than 55 g/100 g, even more preferably greater than 65 g/100 g, and most preferably greater than 75 g/100 g. Also, the invention coated shaped and granular activated carbon will have a butane working capacity greater than 9.0 g/dL, preferably greater than 10.0 g/dL, more preferably greater than 11.0 g/dL, even more preferably greater than 12.0 g/dL, even more preferably greater than 13.0 g/dL, even more preferably greater than 14.0 g/dL, and most preferably greater than 15.0 g/dL.

An additional feature is that this coating provides the pellets with a glossy and attractive appearance that calls attention to product cleanliness. The glossy nature of the coating results from the film-forming nature of the polymer and the emulsion form by which it is applied to the pellets. An added facility, and possible benefit, provided by the invention composition and process is achieved by the natural color of the coating material or by the addition of coloring agents, such as pigments and optical brighteners, to the polymer emulsion. In particular, distinct carbon products may be identified through color-coding. The color-coding may relate to product application, plant origination, customer designation, or any designation desired. The coated shaped and granular activated carbon is also hydrophobic, as demonstrated by floating on water rather than rapidly wetting and sinking. In experiments with coated activated carbon pellets, half of the uncoated pellets sank in 26 seconds when placed in water, whereas the coated pellets were not penetrated by the water and floated for more than 6 days. The resistance to wetting and pore filling with liquid water and other condensed fluids may be of particular utility for evaporative emission canisters which are known occasionally to accumulate or siphon liquid fuel or water. This accumulated liquid would otherwise impair the performance of the adsorbent's ability to capture and recycle fuel vapors for some extended time during the operation of the vehicle.

The difference in appearance between the invention emulsion coated glossy pellets and previous dispersion-coated pellets is due to the different forms of the polymers used in applying the coatings. The particle sizes of emulsions are smaller than dispersions, therefore emulsions form continuous films due to the effects of capillary forces when dried of the carrier liquid. Dispersions do not form continuous films by drying, and they leave behind discrete (i.e., noncontinuous) polymer particles similar in size to the originally dispersed particles. The continuous, emulsion-applied polymer film, on the other hand, provides a glossy appearance, coating integrity, pellet dust reduction, and hydrophobicity that a dispersion-applied, non-continuous film does not.

Also, it should be noted that while the polymer film resulting from the application of the polymer emulsion onto the shaped or granular carbon is a continuous film, it may be porous or non-porous, depending on the irregularity of surface shape of the carbon material. The appearance of a porous continuous film occurs more often on the more irregular shaped granular activated carbons than on shaped activated carbons. A beneficial aspect of the invention disclosed herein is that, for the purpose of de-dusting, the polyethylene film acts as a non-porous film even when porous. Yet, for the purposes of full capture, the film acts as porous so as not to occlude access to the internal pore structure of the carbon.

The process for essentially eliminating dust attrition of activated carbon material by coating the activated carbon material comprising the steps of:

(a) spraying an emulsion of the polymer onto exposed surfaces of the activated carbon material while it is in a state of turbulence at a processing temperature above ambient temperature; and (b) drying the coated activated carbon material.

The process may optionally include an initial step of preheating the active carbon material to above ambient temperature. The process may include multiple repetitions of steps (a) and (b). Also, the process of the claimed invention may comprise a further step (c) de-dusting the dried coated activated carbon material by removing any residual dust therefrom.

As those skilled in the art appreciate, various processing conditions are generally interdependent, such as processing time and processing temperature. These operating conditions as well may depend on the nature of the carbon material to be coated (shaped or granular, coal-based or lignocellulosic-based, etc.) and the coating material (relative volatility, viscosity, etc.). Thus, the temperature range for coating application and coating drying steps may range from just below ambient at about 50° F., up to about 280° F. (138° C.), and the processing time may take from about 1 minute to about 12 hours. For most combinations of shaped or granular active carbon material and coating material, a preferred operating temperature range for the coating and drying steps is from about 70° F. (21° C.) to about 250° F. (121° C.) for from about 5 minutes to about 6 hours.

The turbulent state o f the active carbon material can be induced by various known means. For example, the carbon material, in granular or shaped (usually pellet) form, may be placed in a rotary tumbler, in a mixing device, or on a fluidized bed. While it is critical that the active carbon material be in a kinetic, rather than static, state when the coating material is applied to assure relative even coating on the surface area of the active carbon material, it is not critical how the kinetic state is achieved.

The product of the invention process may be described as a composition of matter comprising an activated carbon material exhibiting initial, pre-coating butane activity and butane working capacity values and having its surface coated with a continuous film of a polymer, said polymer film being operable for essentially eliminating attrition of the activated carbon material resulting from dusting and wherein the coated activated carbon material exhibits final, post-coating butane activity and butane working capacity values of 90–100% of the initial, pre-coating butane working capacity values, respectfully.

The coating materials useful in the claimed invention are those capable of forming a continuous film. In particular, polymers, copolymers, and polymer blends that are suitable coating materials include: polyolefins, such as polyethylene, polypropylene, polyisobutylene, polystyrene, polyisoprene, polychloroprene, poly-4-methyl-1-pentene, polybutadiene, and polybutene; polyacrylics, such as polyacrylates, polymethyl methacrylate, polybutylmethacrylate, polymethacrylates, and polyacrylic acid; halogen-substituted alkanes, such as polytetrafluoroethylene, trifluoroethylene, vinyl fluoride, fluorvinylidene, fluorobutylene, and fluoropropylene; and other polymers including polyurethane, polyethylene terephthalate, styrene butadiene, modified polybutadiene, epoxies, modified alkyds, polyesters, starches, methyl cellulose, ethyl cellulose, carboxymethyl cellulose, polyvinyl acetate, cellulose acetate, cellulose nitrate, cellulose triacetate, cellulose acetate, phthalate, cellulose propionate morpholinobutyrate, hydroxypropylmethyl cellulose, ethylene vinyl acetate, acrylic copolymers, polysulfones, polyether sulfones, polyethers, polyethylene, glycols, polyimines, polybutylene, polyvinyl ethers, polyvinyl esters, polyalkylsulfides, polyarylsulfides, lignosulfonates, polyacrylamide, cyanoacrylate, polyamides, polyimides, polysiloxanes, methacrylonitrile, polyacrylonitrile, polyvinyl pyridine, polyvinyl benzene, polyvinyl acetate, polyvinyl pyrrolidene, polyvinyl butyral, polyvinyl alcohol, polyvinyl chloride, polyvinyl formaldehyde, polyformaldehyde, polycarbonates, and polyvinylidene chloride.

The shaped or granular active carbon material of the invention described herein may be derived from any known active carbon precursors including coal, lignocellulosic materials, including pulp and paper, residues from pulp production, wood (like wood chips, -sawdust, and wood flour), nut shell (like almond shell and coconut shell), kernel, and fruit pits (like olive and cherry stones), petroleum, bone, and blood.

The following examples describe the method and properties of materials that have been treated.

EXAMPLE 1

Two types of coatings were applied to pellets of Westvaco Corporation BAX 1100 activated carbon that provided dust free carbons: a high-density polyethylene (ChemCor polyethylene emulsion Poly Emulsion 325N35) and aminoethylaminopropylpolysiloxane (General Electric silicone emulsion SM2059). Other polymers, including polypropylene and polystyrene, may be employed as alternative coating materials. Coating properties, such as abrasion resistance, permeability, and porosity, may also be further enhanced for a particular class of polymer by selecting, materials with different molecular weight, density, particle size, and/or degree of cross-linking.

The activated carbon pellets were coated by tumbling in a rotating cylinder and initially heated to 250° F. (121° C.) using a hot air gun. An emulsion of the polymer was then sprayed on the carbon in successive doses as the activated carbon was maintained at about 150° F. (66° C.) under the hot air flow. (The emulsion of the polyethylene solution was 3.5 wt % solids. The emulsion of the polysiloxane solution was 3.9 wt % solids.) The coated activated carbon was then dried overnight at 220° F. (105° C.). After drying, any residual dust on the pellet exterior was removed by applying the vibration and airflow treatment of the first 10–20 minutes of the dust attrition test (described below). The final coated product has a shiny, smooth appearance, compared with the dull exterior of the uncoated material.

Table I compares the dust attrition, and butane properties for the uncoated and coated pellets. Data for a baseline sample using only de-ionized water for the spray are also included to prove the importance of the polymer coating on the change in dust properties. Dust attrition rates were measured with the two-point method in a 30-minute test (described below).

TABLE I

| Sample ID | Coating Loading (wt %) | Initial Dust (mg/dL) | Dust Rate (mg/min/dL) | AD (g/mL) | Butane Activity (g/100 g) | Butane Activity (g/dL) | BWC (g/dL) | Butane Ratio |
|---|---|---|---|---|---|---|---|---|
| Uncoated[1] | | | | 0.361 | 35.0 | 12.6 | 10.9 | 0.864 |
| | | 11.4 | 0.69 | 0.353 | 35.0 | 12.4 | 10.9 | 0.883 |
| | | 11.4 | 0.69 | 0.357 | 35.0 | 12.5 | 10.9 | 0.874 |
| Polyethylene Emulsion | | | | | | | | |
| Run 1A | 2.9[2] | 0.00 | 0.00 | 0.361 | 33.0 | 11.9 | 10.2 | 0.858 |
| Run 1B | 1.6[3] | 0.00 | 0.00 | 0.356 | 33.7 | 12.0 | 10.3 | 0.860 |
| Silicone Emulsion | | | | | | | | |
| Run 2 | 3.4[4] | 0.00 | 0.00 | 0.349 | 32.3 | 11.3 | 9.6 | 0.854 |

[1]Same sample, duplicate measurements-to obtain representative average reading.
[2]Derived as average of wet-basis weight gain (1.0 wt %) and emulsion weight used (4.8 wt %).
[3]Derived as average of wet-basis weight gain (0.5 wt %) and emulsion weight used (2.8 wt %).
[4]Derived as average of wet-basis weight gain (0.9 wt %) and emulsion weight used (5.8 wt %).

Initial dust and dust rate values were measured by a modified, 3-filter version of the "Standard Test Method for Dusting Attrition of Granular Carbon" (ASTM D5159–91). A 1.0 dL sample of carbon is placed on a screen with 0.250 mm openings in a test cell holder and is subjected to vibration of 40 m/s/s RMS acceleration and downward air flow of 7 L/min for a 10 minute interval. A glass fiber filter, placed below the sample screen, collects dust from the sample. The vibration and airflow step is conducted three times with three different filters. The dust rate is calculated by the following equation:

Dust Rate (mg/min/dL), $DR = 0.0732 w_3$ where $w_3$ is the milligram weight gain of the third filter.

The dust rate from this equation is within a standard deviation of ±13% of the dust rate obtained by the standard ASTM procedure that uses filter weight data from three additional 10 minute test intervals.

The initial dust is calculated as the milligram weight gain for the first filter, $w_1$, minus the amount of dust attrited within 10 minutes (10×DR):

Initial Dust (mg/dL) = $w_1 - 10 DR$.

Note that the weight gain of the second filter, $w_2$, is not directly applied in these calculations. However, the $w_2$ value has utility in confirming whether dust rate detection limits have been reached for a sample by showing a zero or negative weight gain.

The inherent error in dust rate is ±0.01 mg/dL by a partial differential error analysis of its equation for calculation and the 0.1 mg readability of the four decimal place gram balance required in the procedure. Likewise, the inherent error in initial dust is ±0.3 mg/dL. Therefore, the non-detect dust rate value would be 0.01 mg/min/dL and the initial dust value would be 0.3 mg/dL.

Compared with the reduction of initial dust, the sharp reduction in dust rate is the more important feature of the coated shaped or granular activated carbon materials. By definition, a dust rate of 0.01 mg/min/dL or less means that initial dust was removed within the attrition test to the detection limits of the test, and demonstrates that initial dust would be likewise readily removed by other means. Alternatively, complete removal of initial dust without a sharp reduction in dust rate is perceived as being comparatively less useful since dust would be expected to readily reappear upon exposure of the sample to inter-particle motion from vibration, agitation or other motive force acting thereon.

The butane activity and butane working capacity (BWC) values were determined according to the procedure disclosed in U.S. Pat. No. 5,204,310 and such teaching is incorporated by reference herein.

The data in Example 1 show that, as a result of the polymer coatings, the treated samples show initial dust and dust rate values in the non-detect range.

EXAMPLE 2

Further tests show that similarly coated activated carbon pellets (Westvaco Corporation BAX 1500) exhibit increased abrasion resistance, as measured by a standard pellet hardness test (CTC Procedure 960–130), which is a modified version of ASTM D3802–79 (ball pan hardness). The pellet hardness test involves shaking the sample (2 mm extruded carbon pellets) in a Ro-Tap Sieve Shaking Machine with stainless steel balls (10 of ¾ inch diameter and 20 of ½ inch diameter) and measuring the amount of pellet breakage in terms of the change in mean particle size of particles collected in a special pan at the bottom of an equivalent 6 (full height) high sieve nest (consisting of #6, #8, #10, #12, #14, #18, and #60). Step 1: a standard performed on 100 grams of sample material and the fractions of material on each sieve is weighed. Step 2: then the fractions are combined in the special pan with the 30 steel balls, and the special pan is shaken on the Ro-Tap for 20 minutes, after which the shaken sample is poured onto the top sieve of the sieve nest. Repeat steps 1 and 2, except the Ro-Tap time for step 2 is 10 minutes. Calculate the average particle size. The strength values are determined by dividing the mean particle diameter after grinding by the initial mean particle diameter and multiplying the quotient by 100.

One coated sample ("Run 3A") was as a composite of 10 replicate preparations using the polymer application method of Example 1. Another coated sample ("Run 3B") was prepared differently. A larger, 2-ft diameter rotating cylinder with lifters was used, and the samples was initially heated by indirect- and direct-fired burners rather than direct hot air flow. No de-dusting step was applied.

Table II compares the hardness, butane and dust attrition properties for the uncoated and coated pellets. Dust data were measured by a three-filter test method.

TABLE II

| Sample ID | Coating Loading (wt %) | Pellet Hardness | AD (g/mL) | Butane Activity (g/100 g) | Butane Activity (g/dL) | BWC (g/dL) | Butane Ratio | Initial Dust (mg/dL) | Dust Rate (mg/min/dL) |
|---|---|---|---|---|---|---|---|---|---|
| Uncoated Coated | — | 68.6 | 0.295 | 60.2 | 17.7 | 15.4 | 0.870 | 3.2 | 0.22 |
| Run 3A[1] | 3.3 | 99.9 | 0.304 | 60.0 | 18.2 | 15.5 | 0.849 | 0.9 | 0.01 |
| Run 3B[2] | 2.6 | 100.0 | 0.298 | 59.7 | 17.8 | 15.3 | 0.860 | 1.8 | 0.03 |

[1]Composite sample: Butane ratio, activity and BWC are average values for its 10 constituent replicate samples.
[2]Different preparation method vs. Run 3A, plus no de-dusting step employed to remove initial dust.

The demonstration of increased hardness was made with 2 mm diameter BAX 1500 pellets of 68.6 hardness before coating. Pellets coated with about 1–3 wt % polyethylene have hardnesses of 99.9–100.0, indicating no change in mean particle size in the test. Compared with the uncoated pellets, the coated pellets retained 97–100% of the butane working capacity.

EXAMPLE 3

To show that the benefit of coated active carbon dust attrition reduction or elimination is applicable to a variety of commercial activated carbons, samples of a shaped commercial coal-based activated carbon (Kuraray 3GX) and a shaped commercial olive pit-based activated carbon pellets (Norit CNR 115) were coated with polyethylene (9.0 wt % emulsion solids) and compared with a similarly coated shaped commercial wood-based activated carbon (Westvaco Corporation BAX 1500). The polymer coating has the same benefits as previously shown with wood-based BAX 1100 and BAX 1500 pellets for reducing dust without significant effect on key properties.

The coatings were applied by the previously described method of Example 1. A de-dusting step was not applied prior to analyses. The polymer loadings (coating wt. %) were determined by heating samples to 932° F. (500° C.) and measuring the amount of volatilized components with a hydrocarbon analyzer calibrated with carbons of known polyethylene content.

Figure 2:
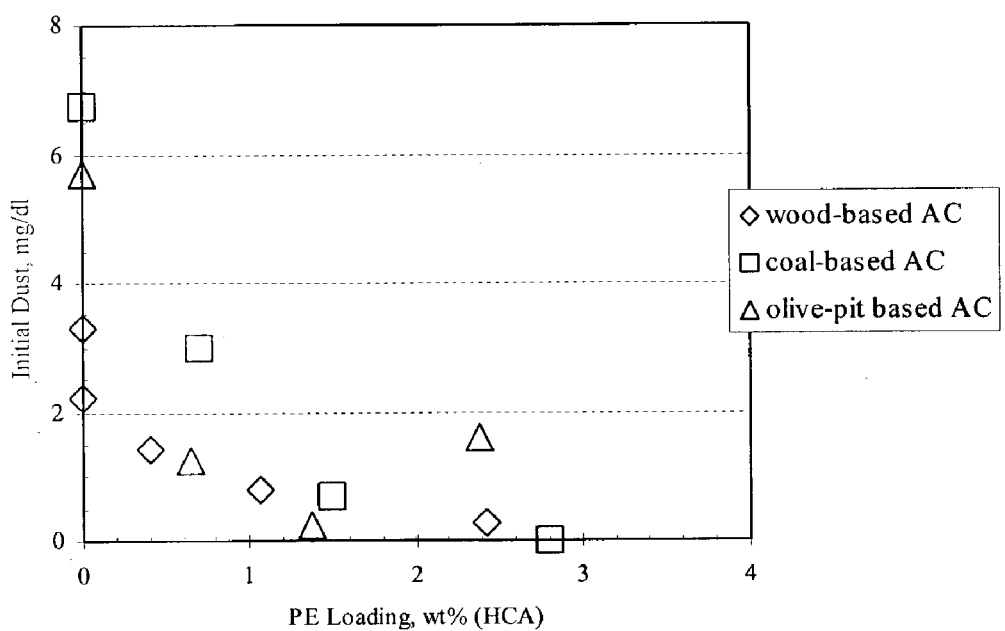
FIG. 2 is a graphical representation of the initial dust values of polymer coated, shaped activated carbons of various sources, as well as the effect of the polymer coating on their respective initial dust values, as reported in Table III.
Figure 3:
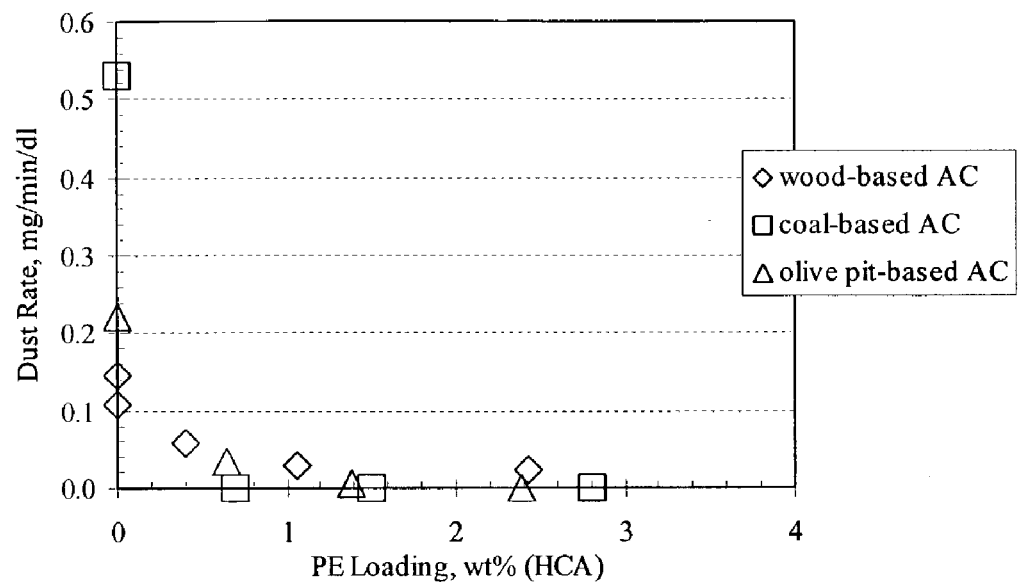
FIG. 3 is a graphical representation of the dust rate values of polymer coated, shaped activated carbons of various sources, as well as the effect of the polymer coating on their respective dust rate values, as reported in Table III.

The results are shown in Table III and FIGS. 1, 2, and 3.

TABLE III

| Sample ID | Measured Loading (wt %) | AD (g/mL) | Butane Activity (%) | Butane Activity (g/dL) | BWC (g/dL) | Butane Ratio | Initial Dust (mg/dL) | Dust Rate (mg/min/dL) |
|---|---|---|---|---|---|---|---|---|
| 2 mm wood-based | | | | | | | | |
| Uncoated* | — | 0.282 | 66.5 | 18.8 | 16.2 | 0.865 | 2.24 | 0.15 |
| | — | 0.283 | 62.9 | 17.8 | 15.8 | 0.890 | 3.31 | 0.11 |
| average: | | 0.283 | 64.7 | 18.3 | 16.0 | 0.878 | 2.78 | 0.13 |
| Coated | | | | | | | | |
| Run 4A | 0.4 | 0.279 | 65.1 | 18.2 | 15.7 | 0.863 | 1.42 | 0.06 |
| Run 4B | 1.1 | 0.282 | 65.1 | 18.4 | 16.0 | 0.868 | 0.81 | 0.03 |
| Run 4C | 2.4 | 0.288 | 63.8 | 18.4 | 15.9 | 0.867 | 0.28 | 0.02 |
| 2.8 mm coal-based | | | | | | | | |
| Uncoated* | — | 0.326 | 51.3 | 16.7 | 14.4 | 0.859 | | |
| | — | 0.323 | 50.7 | 16.4 | 14.2 | 0.870 | 6.76 | 0.53 |
| average: | | 0.325 | 51.0 | 16.6 | 14.3 | 0.864 | 6.76 | 0.53 |
| Coated | | | | | | | | |
| Run 5A | 0.7 | 0.328 | 52.6 | 17.3 | 14.6 | 0.847 | 3.00 | 0.00 |
| Run 5B | 1.5 | 0.334 | 51.3 | 17.1 | 14.5 | 0.847 | 0.70 | 0.00 |
| Run 5C | 2.8 | 0.337 | 51.2 | 17.3 | 14.5 | 0.838 | 0.00 | 0.00 |
| 2 mm olive pit-based | | | | | | | | |
| Uncoated | — | 0.355 | 41.4 | 14.7 | 12.4 | 0.847 | 5.7 | 0.22 |
| Coated | | | | | | | | |
| Run 6A | 0.7 | 0.347 | 44.2 | 15.4 | 12.3 | 0.801 | 1.24 | 0.04 |
| Run 6B | 1.4 | 0.353 | 44.2 | 15.6 | 12.3 | 0.789 | 0.23 | 0.01 |
| Run 6C | 2.4 | 0.356 | 43.5 | 15.5 | 12.2 | 0.791 | 1.60 | 0.00 |

*Same sample, duplicate measurements-to obtain representative average reading.

Compared with their respective uncoated base carbons, initial dust and dust rate are sharply reduced. Butane working capacity and butane activity, on a volume basis, are unaffected.

EXAMPLE 4

Acrylic copolymer is another example of an active carbon coating material, in addition to the previously cited polyethylene and silicone materials, in the present invention. BAX 1100 and BAX 1500 active carbon pellets were coated in the lab with JONREZ® E-2062, an acrylic copolymer salt solution produced by Westvaco Corporation.

The coatings were applied by the previously described method of Example 1. After evaluating the properties of two samples of uncoated BAX 1500, two samples of the same BAX 1500 plant production were coated with a 9.0 wt % solids acrylic copolymer emulsion. Similarly, after measuring the properties of a sample of uncoated BAX 1100, a sample of the same BAX 1100 plant production was coated with a 6.0 wt % solids acrylic copolymer emulsion. A de-dusting step was not applied prior to analyzing the coated products. The coating loading on BAX 1500 was determined by heating samples to 932° F. (500° C.) and measuring the amount of volatilized components with a hydrocarbon analyzer calibrated with carbons of known acrylic copolymer content. The coating loading on BAX 1100 was derived from the wet-basis weight gain of the coated sample and the amount of applied emulsion spray. The acrylic copolymer coating has the same benefits as previously shown with polyethylene and silicone for reducing dust without significant effect on key properties, as shown in Table IV.

The data show that a 1.6 wt % polymer coating on the BAX 1500 shaped active carbon essentially eliminated dusting, with only an insignificant loss in BWC. Even more surprising is that a 3.4 wt % coating on the same active carbon material achieved total elimination of dusting, with a negligible loss in BWC. Also, a 4.3 wt % coating of the BAX 1100 shaped active carbon achieved a total elimination of dusting, with only a 6.4% reduction of BWC.

Figure 4:
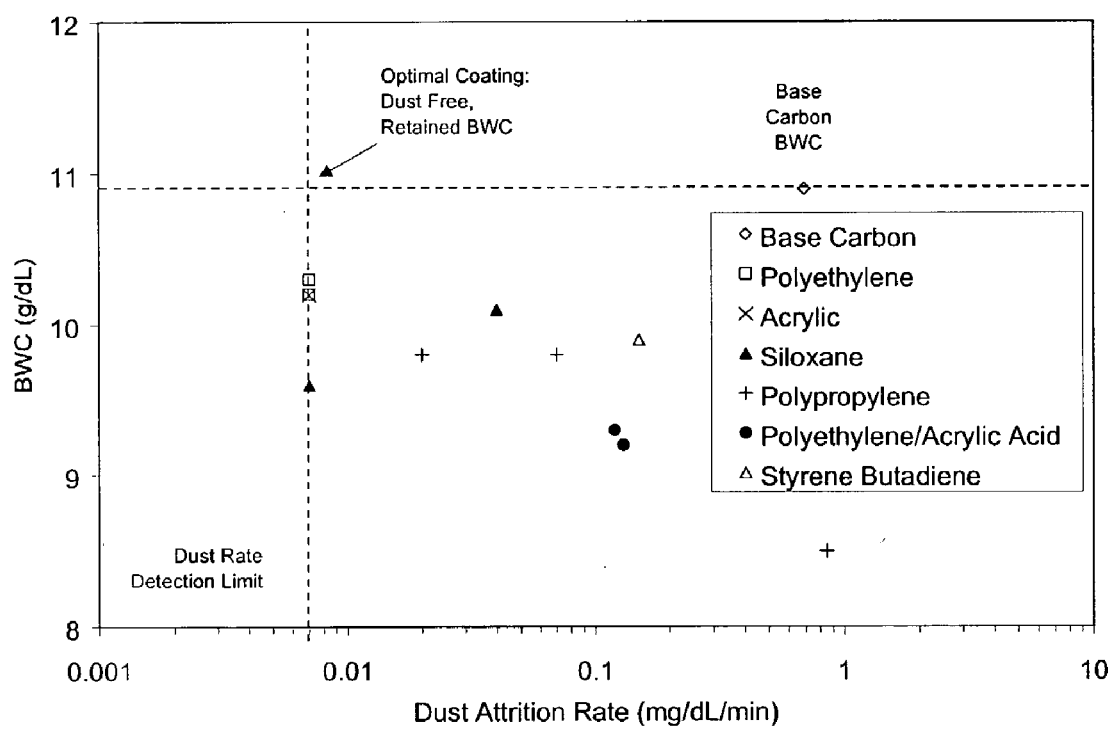
FIG. 4 is a graphical representation of the BWC and dust attrition values of a commercial automotive emission control activated carbon compared with the same carbon coated with various materials.

Ideally, for use in automotive emission control canisters the BWC of the starting material would be maintained while the dust attrition rate is reduced to or below the detection limit of a dust attrition test. BWC of pellets coated with different polymers is plotted as a function of dust attrition rate in FIG. 1. Of various polymers examined, polyethylene and a Jonrez-brand acrylic manufactured by Westvaco Corporation Chemical Division are preferred since dust attrition was reduced while most of the original pellet BWC was retained. Siloxane, polypropylene, polyethylene/acrylic acid, and styrene butadiene coatings caused greater reduction in BWC and/or did not reduce the dust attrition rate as much as polyethylene and Jonrez acrylic coatings. The data of FIG. 4 are listed in Table V.

TABLE IV

| Sample ID | Coating (wt %) | AD (g/mL) | Butane Activity (%) | Butane Activity (g/dL) | BWC (g/dL) | Butane Ratio | Initial Dust (mg/dL) | Dust Rate (mg/min/dL) |
|---|---|---|---|---|---|---|---|---|
| Uncoated | — | 0.282 | 66.5 | 18.8 | 16.2 | 0.865 | 2.24 | 0.15 |
| BAX 1500[1] | — | 0.283 | 62.9 | 17.8 | 15.8 | 0.890 | 3.31 | 0.11 |
| average: | | 0.283 | 64.7 | 18.3 | 16.0 | 0.878 | 2.78 | 0.13 |
| Coated with Acrylic Copolymer | | | | | | | | |
| Run 7A | 1.6[2] | 0.277 | 65.0 | 18.0 | 15.6 | 0.868 | 1.93 | 0.01 |
| Run 7B | 3.4[2] | 0.283 | 64.7 | 18.3 | 15.8 | 0.862 | 1.30 | 0.00 |
| Uncoated | — | 0.361 | 35.0 | 12.6 | 10.9 | 0.864 | | |
| BAX 1100[3] | — | 0.353 | 35.0 | 12.4 | 10.9 | 0.883 | 11.40 | 0.69 |
| average: | | 0.357 | 35.0 | 12.5 | 10.9 | 0.874 | 11.40 | 0.69 |
| Coated with Acrylic Copolymer | | | | | | | | |
| Run 8 | 4.3[4] | 0.352 | 34.0 | 12.0 | 10.2 | 0.856 | 1.02 | 0.00 |

[1]Noted as Uncoated wood-based samples in Table III
[2]Measured by hydrocarbon analyzer method
[3]Noted as "Uncoated" sample in Table I
[4]Average of 1.0 and 7.7 wt % (from wet-basis weight gain and emulsion solids sprayed, respectively)

TABLE V

| | Coating | | Initial | Dust Attrition | AD | | | |
|---|---|---|---|---|---|---|---|---|
| Polymer | Content wt % | BWC g/dL | Dust mg/dL | Rate mg/dL/min | AD g/ml | carbon g/ml | PD g/ml | VF % |
| None | 0 | 10.9 | 11.4 | 0.69 | 0.357 | 0.357 | 0.536 | 33.4 |
| Acrylic | 4.3 | 10.2 | 1 | 0.007 | 0.352 | 0.337 | 0.569 | 38.1 |
| Polyethylene | 2.9 | 10.2 | 1.9 | 0.007 | 0.361 | 0.351 | 0.551 | 34.5 |
| Polyethylene | 1.6 | 10.3 | 2.2 | 0.007 | 0.356 | 0.350 | 0.548 | 35.0 |
| Polyethylene/Acrylic Acid | 1.9 | 9.3 | 5.4 | 0.12 | 0.335 | 0.329 | 0.562 | 40.4 |
| Polyethylene/Acrylic Acid | 2.8 | 9.2 | 8.7 | 0.13 | 0.338 | 0.329 | 0.563 | 40.0 |
| Polypropylene | 3 | 9.8 | 11.5 | 0.07 | 0.35 | 0.340 | 0.56 | 37.5 |

TABLE V-continued

| Coating | | | Initial | Dust Attrition | | AD | | |
|---|---|---|---|---|---|---|---|---|
| Polymer | Content wt % | BWC g/dL | Dust mg/dL | Rate mg/dL/min | AD g/ml | carbon g/ml | PD g/ml | VF % |
| Polypropylene | 3.6 | 9.8 | 1.7 | 0.02 | 0.349 | 0.336 | 0.558 | 37.5 |
| Polypropylene | 7.3 | 8.5 | 47.9 | 0.85 | 0.328 | 0.304 | 0.573 | 42.8 |
| Siloxane | 2.3 | 10.1 | 0 | 0.04 | 0.353 | 0.345 | 0.56 | 37.0 |
| Siloxane | 3.4 | 9.6 | 0.8 | 0.007 | 0.349 | 0.337 | 0.569 | 38.7 |
| Styrene Butadiene | 1.9 | 9.9 | 6.2 | 0.15 | 0.332 | 0.326 | 0.563 | 41.0 |

Figure 5:
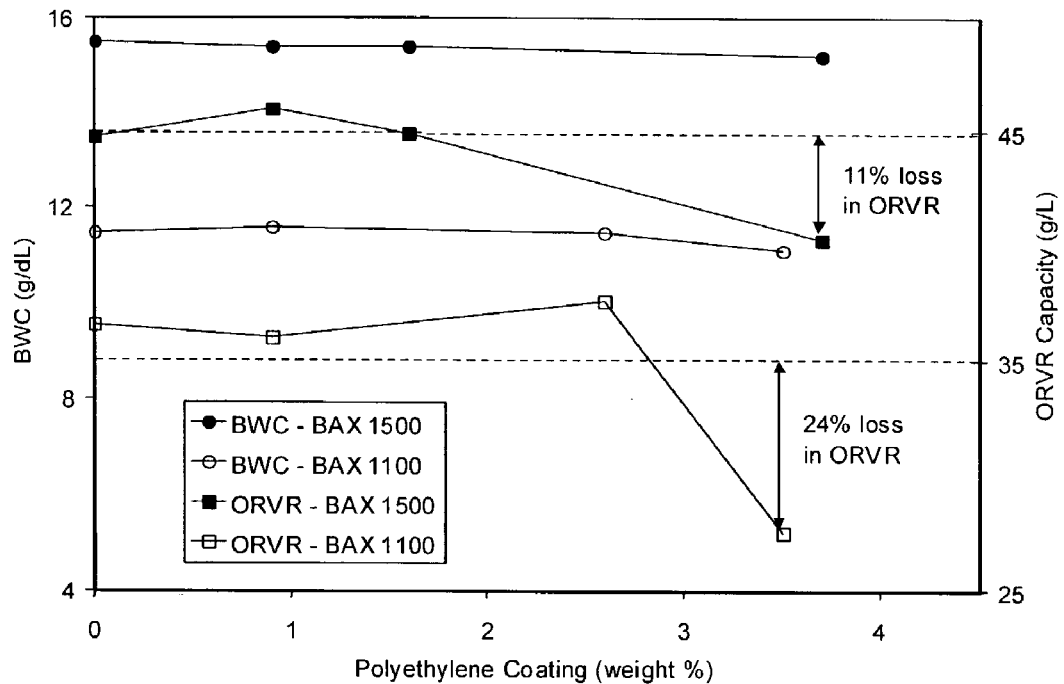
FIG. 5 is a graphical representation of a comparison of the BWC and ORVR values of activated carbon coated with varying amounts of polyethylene.

The optimal amount of coating for use in automotive emission control canisters can be chosen so that attrition rate is essentially non-detectable without significantly changing adsorptive properties. BWC, while useful, is not the sole measure of canister performance. Some coated activated carbons may have little or no loss of BWC so that they appear similar to uncoated activated carbon suitable for use in ORVR applications, when in fact mass transfer resistance imposed by the coating on the exterior of the activated carbon reduces the capacity under ORVR conditions. With polyethylene coatings below 3.5%, BWC and ORVR capacity was essentially unchanged, as shown by data in Table VI and FIG. 5.

TABLE VI

Properties of PE Coated and Uncoated Carbon Pellets

| Description | Initial Dust mg/dL | Dust Rate mg/dL/min | BWC g/dL | GWC g/L | ORVR g/L |
|---|---|---|---|---|---|
| BAX 1100 uncoated | 33.6 | 2.36 | 11.5 | 59.1 | 36.6 |
| BAX 1100-0.9% PE | 0.51 | 0.77 | 11.6 | 60.1 | 36.0 |
| BAX 1100-2.6% PE | 2.40 | <0.007 | 11.5 | n/a | 37.6 |
| BAX 1100-3.5% PE | 0.90 | <0.007 | 11.1 | n/a | 27.5 |
| BAX 1500 uncoated | 3.20 | 0.219 | 15.5 | 75.4 | 44.8 |
| BAX 1500-0.9% PE | 1.28 | 0.022 | 15.4 | 72.4 | 46.0 |
| BAX 1500-1.6% PE | 1.16 | 0.014 | 15.4 | 73.9 | 44.9 |
| BAX 1500-3.7% | 0.93 | 0.007 | 15.2 | 72.3 | 40.3 |

With a coating greater than about 3.5%, ORVR capacity dropped and would require a larger canister to have the same adsorptive capacity as pellets with less or no coating. Other polymers besides polyethylene would have to be used at less than a coating content of 3% due to their great packing disruption and certain loss of BWC, GWC and ORVR capacity. A lower coating content of these other materials than listed in Table VI may not cause an adverse reduction in ORVR capacity, although reduction in dust attrition is likely marginal.

An indication of whether a coated activated carbon is useful for automotive canisters is the apparent density of the activated carbon after the coating is applied. Apparent density of an activated carbon after it is coated is the product of the apparent density of the coated carbon and the fraction of the coated product that is activated carbon, as defined below.

$$\text{Apparent Density of Activated Carbon} = \text{Apparent Density of Coated Carbon} \times (1 - \text{Coating Content})$$

A canister having less activated carbon inside it will have lower adsorptive capacity or will require a larger vessel at added cost and space in the vehicle in order to hold the same amount of activated carbon. Reduction of the amount of activated carbon inside a canister is due to activated carbon being displaced by coating and by packing disruption that increases the void fraction among the pellets or granules within the canister. Applying less coating can reduce displacement of activated carbon, although such a strategy has to be weighed against the objective of meeting the desired initial dust and/or dust attrition rate target(s).

Ideally the packing of activated carbon within a canister would not be disrupted by the presence of a coating so that the void fraction is unchanged. Any packing disruption decreases the volumetric capacity of a canister, regardless of gravimetric adsorptive capacity and mass transfer characteristics of the coated activated carbon. The void fraction of the coated activated carbon can be used as a guide for selecting a coating material. The void fraction, VF, defined below, with AD as the apparent density and PD as the particle density, is a useful indicator of the packing efficiency within the canister.

$$VF(\%) = 100*(1 - AD/PD)$$

Table VII lists dust properties, BWC, and void fractions for activated carbon pellets coated with 1.9–4.3% of different polymers.

TABLE VII

Properties of BAX 1100 Coated with Different Polymers

| Coating Polymer | Coating Content % | Initial Dust mg/dL | Dust Rate mg/dL/min | BWC g/dL | VF % |
|---|---|---|---|---|---|
| Uncoated | 0 | 11.4 | 0.69 | 10.9 | 33.4 |
| Polypropylene | 3.0 | 11.5 | 0.07 | 9.8 | 37.5 |
| Polyethylene/ Acrylic Acid | 2.8 | 8.7 | 0.13 | 9.2 | 40.0 |
| Polyethylene | 2.9 | 1.2 | 0.00 | 10.3 | 34.5 |
| Siloxane | 3.4 | 0.8 | 0.00 | 9.6 | 38.7 |
| Styrene butadiene | 1.9 | 6.2 | 0.15 | 9.9 | 41.0 |
| Acrylic Copolymer | 4.3 | 1.0 | 0.00 | 10.2 | 38.1 |

Figure 6:
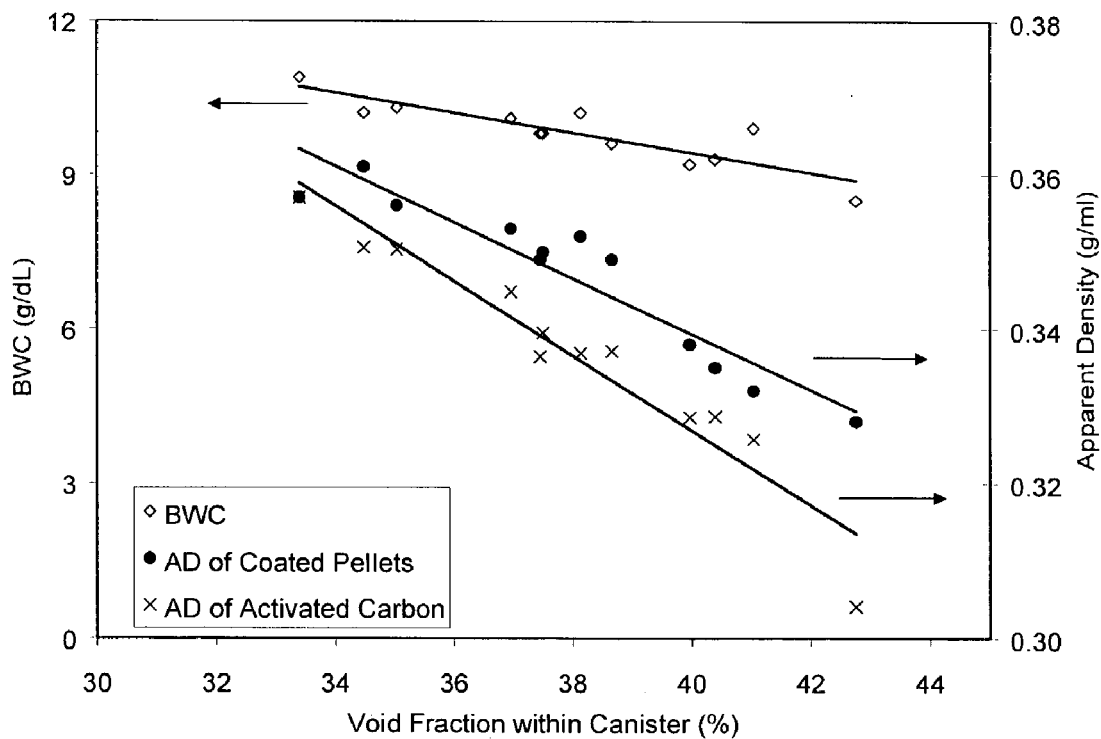
FIG. 6 is a graphical representation of a comparison of the BWC and apparent density values of uncoated commercial automotive emission control activated carbon and the same pellets coated with different polymers.

Of the polymers tested, polyethylene and an acrylic copolymer caused the least packing disruption and gave the highest BWC values while also giving low initial dust and dust attrition rates. BWC losses correspond to decreased apparent densities of the coated pellets and of the activated carbon inside a canister. FIG. 6 shows the effect of the same Based on the results for clear-coated pellets and the polyethylene contents of these color-coated pellets, GWC and ORVR capacity would be expected to be much the same as for the uncoated pellets.

TABLE VIII

Color and BWC Properties for BAX 1500 Pellets Coated with Various Pigments

| Carbon Color | Pigment Identification | Total Polyethylene wt % | Pigment wt % | AD g/ml | AD, carbon-basis g/ml | BWC g/dL |
|---|---|---|---|---|---|---|
| Black | None | None | None | 0.281 | 0.281 | 15.6 |
| Blue-I | Afflair 103 New Rutile Silver (a) Liquiflex blue BR-2025 (b) | 2.0 | 1.0 + 1.0 | 0.287 | 0.278 | 15.4 |
| Silver | Afflair 119 Polar white (a) | 1.75 | 1.0 | 0.290 | 0.282 | 15.5 |
| Bronze | Afflair 500 Bronze (a) | 1.75 | 1.0 | 0.288 | 0.280 | 15.3 |
| Copper | Afflair Red brown (a) | 1.75 | 1.0 | 0.290 | 0.282 | 15.4 |
| Blue-II | Afflair 103 New Rutile Silver (a) + Liquiflex blue BR-2025 (b) | 1.25 | 1 + 0.5 | 0.290 | 0.282 | 15.3 |

(a) Manufactured by EM Industries
(b) Manufactured by Drew Graphics polymers as listed in Table VII, but over a broader range of coating contents of 1.6–7.3%. The data of FIG. 3 are listed in Table V.

Another reason for avoiding excessive packing disruption is related to the longevity of automotive canisters since they are typically designed to last the lifetime of the vehicles on which they are installed. Canisters filled with coated activated carbon that has a higher void fraction may experience densification of the activated carbon with time. If the canister is initially packed with a higher void fi-action and later the activated carbon settles, an uneven distribution of particles with loosely and tightly packed regions within the canister could result. Suck uneven packing may cause flows disruptions or channeling and reduce the performance of the canister. To avoid this situation, coatings should be chosen so that the bed void fraction after coating is nearly identical to the bed void fraction prior to coating, thus reducing the possibility of the coated activated carbon later settling within the canister.

A variety of colored carbons can be prepared by choosing the proper combination of pigments for addition to the polymer emulsion and the emulsion application methods, as taught in the foregoing examples and in Table VIII, in order to attain the desired color, plus obtain the desired benefits of the coating. Table VIII illustrates the range of colors obtained by coating BAX 1500 with different pigments while retaining more than 98% of the original BWC of the parent activated carbon. For example, blue pellets were obtained by applying a polymer coating with containing silver pigment to give a base silver color coating, followed by a second polymer coating containing the blue pigment, Example "Blue-I." A second means for attaining a blue carbon is to blend the blue pigment with the high opacity silver pigment with the polymer emulsion and apply as a single coating, Example "Blue-II." The pigments have equal or greater particle density than the polyethylene, so the colored pellets have apparent densities that are more similar or even greater than the apparent density of uncoated pellets. Since these colored coated pellets were coated with polyethylene, packing disruption was small. The density of activated carbon in a canister filled with any of these colored pellets would exhibit greater than 97% of the density of activated carbon in a canister filled with uncoated pellets.

Thus, the subject matter of the applicants' invention is:

(1) A method for capturing fuel vapor from a fluid stream containing same in an automobile by routing said stream through an emission control canister comprising an activated carbon material exhibiting initial, pre-coating butane activity and butane working capacity values and having its surface coated with a continuous film of a polymer, said polymer film being operable for essentially eliminating attrition of the activated carbon material resulting from dusting and wherein the coated activated carbon material exhibits final, post-coating butane activity and butane working capacity values at least 90% of the initial, pre-coating butane activity and butane working capacity values, respectively;

(2) the method of (1) wherein the activated carbon material is coated by:
   (a) spraying an emulsion of the polymer onto exposed surfaces of the activated carbon material while it is in a state of turbulence at a processing temperature above ambient temperature; and
   (b) drying the coated activated carbon material at above ambient temperature; and (3) the method of (1) and (2) wherein the polymer coating essentially eliminates attrition of the activated carbon material resulting from dusting and the coated activated carbon exhibits a butane activity value greater than 15 g/100 g.

While the preferred embodiments of the present invention have been described, it should be understood that various changes, adaptations, and modifications may be made thereto without departing from the spirit of the invention and the scope of the appended claims. It should be understood, therefore, that the invention is not to be limited to minor details of the illustrated invention shown in preferred embodiment and the figures and that variations in such minor details will be apparent to one skilled in the art. The claims, therefore, are to be accorded a range of equivalents commensurate in scope with the advances made over the art.

What is claimed is:

1. A method for capturing fuel vapor from a fluid stream containing same in an automobile by routing said stream through an emission control canister comprising an activated carbon material exhibiting initial, pre-coating butane activity and butane working capacity values and having its surface coated with a continuous film of a polymer, said polymer film being operable for essentially eliminating attrition of the activated carbon material resulting from dusting and wherein the coated activated carbon material exhibits final, post-coating butane activity and butane working capacity values at least 90% of the initial, pre-coating butane activity and butane working capacity values, respectively.

2. The method of claim 1 wherein the final, post-coating butane activity and butane working capacity values are at least 95% of the initial, pre-coating butane activity and butane working capacity values, respectively.

3. The method of claim 1 wherein the final, post-coating butane activity and butane working capacity values are at least 98% of the initial, pre-coating butane activity and butane working capacity values, respectively.

4. The method of claim 1 wherein the final, post-coating butane activity and butane working capacity values are at least 100% of the initial, pre-coating butane activity and butane working capacity values, respectively.

5. A method for capturing gasoline vapor and combustion emission from a fluid stream containing same in an automobile by routing said stream through an emission control canister comprising a polymer-coated activated carbon material exhibiting essentially no dusting attrition of the activated carbon material and said activated carbon material exhibits initial, pre-coated butane activity and butane working capacity values and wherein the coated activated carbon material exhibits final, post-coating butane activity and butane working capacity values at least 90% of the initial, pre-coating butane activity and butane working capacity values, respectively.

6. The method of claim 5 wherein the final, post-coating butane activity and butane working capacity values are at least 95% of the initial, pre-coating butane activity and butane working capacity values, respectively.

7. The method of claim 6 wherein the final, post-coating butane activity and butane working capacity values are at least 98% of the initial, pre-coating butane activity and butane working capacity values, respectively.

8. The method of claim 7 wherein the final, post-coating butane activity and butane working capacity values are at least 100% of the initial, pre-coating butane activity and butane working capacity values, respectively.

9. A method for capturing gasoline vapor and combustion emission from a fluid stream containing same in an automobile by routing said stream through an emission control canister comprised of a polymer-coated activated carbon prepared by coating the activated carbon material according to the steps of:
   (a) spraying an emulsion of the polymer onto exposed surfaces of the activated carbon material while it is in a state of turbulence at a processing temperature above ambient temperature; and
   (b) drying the coated activated carbon material at above ambient temperature.

10. The method of claim 9 comprising a further step
   (c) de-dusting the dry coated activated carbon material by removing any residual dust therefrom.

11. The method of claim 9 further comprising an initial step of heating the active carbon material at above ambient temperature.

12. The method of claim 9 wherein the processing temperature is maintained from 50° F. (10° C.) to 280° F. (138° C.) for from about 1 minute to about 12 hours.

13. The method of claim 12 wherein the processing temperature is maintained from about 70° F. (21° C.) to about 250° C. (121° C.) for from about 5 minutes to about 6 hours.

14. The method of claim 1 wherein the polymer is selected from the group consisting of polyethylene, polypropylene, polyisobutylene, polystyrene, polyisoprene, polychloroprene, poly-4-methyl-1-pentene, polybutadiene, polybutene, polyacrylate, polymethyl methacrylate, polybutylmethacrylate, polymethacrylates, polyacrylic acid, polytetrafluoroethylene, trifluoroethylene, vinyl fluoride, fluorvinylidene, fluorobutylene, fluoropropylene, polyurethane, polyethylene terephthalate, styrene butadiene, modified polybutadiene, epoxies, modified alkyds, polyesters, starches, methyl cellulose, ethyl cellulose, carboxymethyl cellulose, polyvinyl acetate, cellulose acetate, cellulose nitrate, cellulose triacetate, cellulose acetate, phthalate, cellulose propionate morpholinobutyrate, hydroxypropylmethyl cellulose, ethylene vinyl acetate, acrylic polymers and copolymers, polysulfones, polyether sulfones, polyethers, polyethylene, glycols, polyimines, polybutylene, polyvinyl ethers, polyvinyl esters, polyalkylsulfides, polyarylsulfides, lignosulfonates, polyacrylamide, cyanoacrylate, polyamides, polyimides, polysiloxanes, methacrylonitrile, polyacrylonitrile, polyvinyl pyridine, polyvinyl benzene, polyvinyl acetate, polyvinyl pyrrolidene, polyvinyl butyral, polyvinyl alcohol, polyvinyl chloride, polyvinyl formaldehyde, polyformaldehyde, polycarbonates, and polyvinylidene chloride.

15. The method of claim 14 wherein the polymer is selected from the group consisting of acrylic polymer and polyethylene.

16. The method of claim 1 wherein the active carbon material is derived from a member of the group consisting of coal, lignocellulosic materials, petroleum, bone, and blood.

17. The method of claim 16 wherein the lignocellulosic materials are selected from the group consisting of including pulp, paper, residues from pulp production, wood chips, sawdust, wood flour, nut shell, kernel, and fruit pits.

18. The method of claim 5 wherein the polymer is selected from the group consisting of polyethylene, polypropylene, polyisobutylene, polystyrene, polyisoprene, polychloroprene, poly-4-methyl-1-pentene, polybutadiene, polybutene, polyacrylate, polymethyl methacrylate, polybutylmethacrylate, polymethacrylates, polyacrylic acid, polytetrafluoroethylene, trifluoroethylene, vinyl fluoride, fluorvinylidene, fluorobutylene, fluoropropylene, polyurethane, polyethylene terephthalate, styrene butadiene, modified polybutadiene, epoxies, modified alkyds, polyesters, starches, methyl cellulose, ethyl cellulose, carboxymethyl cellulose, polyvinyl acetate, cellulose acetate, cellulose nitrate, cellulose triacetate, cellulose acetate, phthalate, cellulose propionate morpholinobutyrate, hydroxypropylmethyl cellulose, ethylene vinyl acetate, acrylic polymers and copolymers, polysulfones, polyether sulfones, polyethers, polyethylene, glycols, polyimines, polybutylene, polyvinyl ethers, polyvinyl esters, polyalkylsulfides, polyarylsulfides, lignosulfonates, polyacrylamide, cyanoacrylate, polyamides, polyimides, polysiloxanes, methacrylonitrile, polyacrylonitrile, polyvinyl pyridine, polyvinyl benzene, polyvinyl acetate, polyvinyl pyrrolidene, polyvinyl butyral, polyvinyl alcohol, polyvinyl chloride, polyvinyl formaldehyde, polyformaldehyde, polycarbonates, and polyvinylidene chloride.

19. The method of claim 18 wherein the polymer is selected from the group consisting of polysiloxane, acrylic copolymer and polyethylene.

20. The method of claim 1 wherein a color pigment is added to the polymer emulsion to produce a colored activated carbon material.

* * * * *